H. B. SHAW.
CAMERA SUPPORT.
APPLICATION FILED FEB. 3, 1910.
1,006,693.
Patented Oct. 24, 1911.
2 SHEETS—SHEET 1.
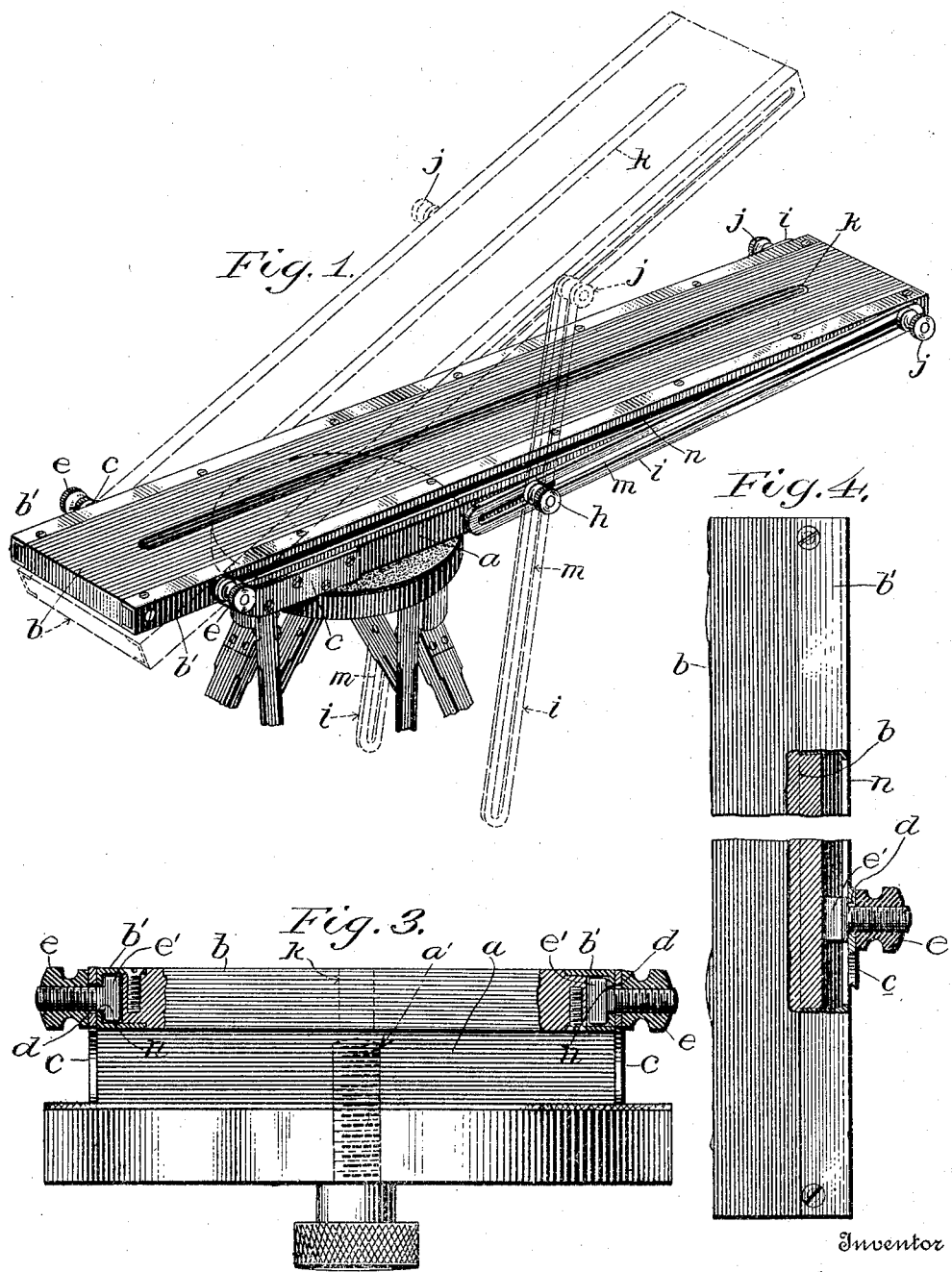
Witnesses
Cel Burdine
W. A. Orton
Inventor
Harry B. Shaw

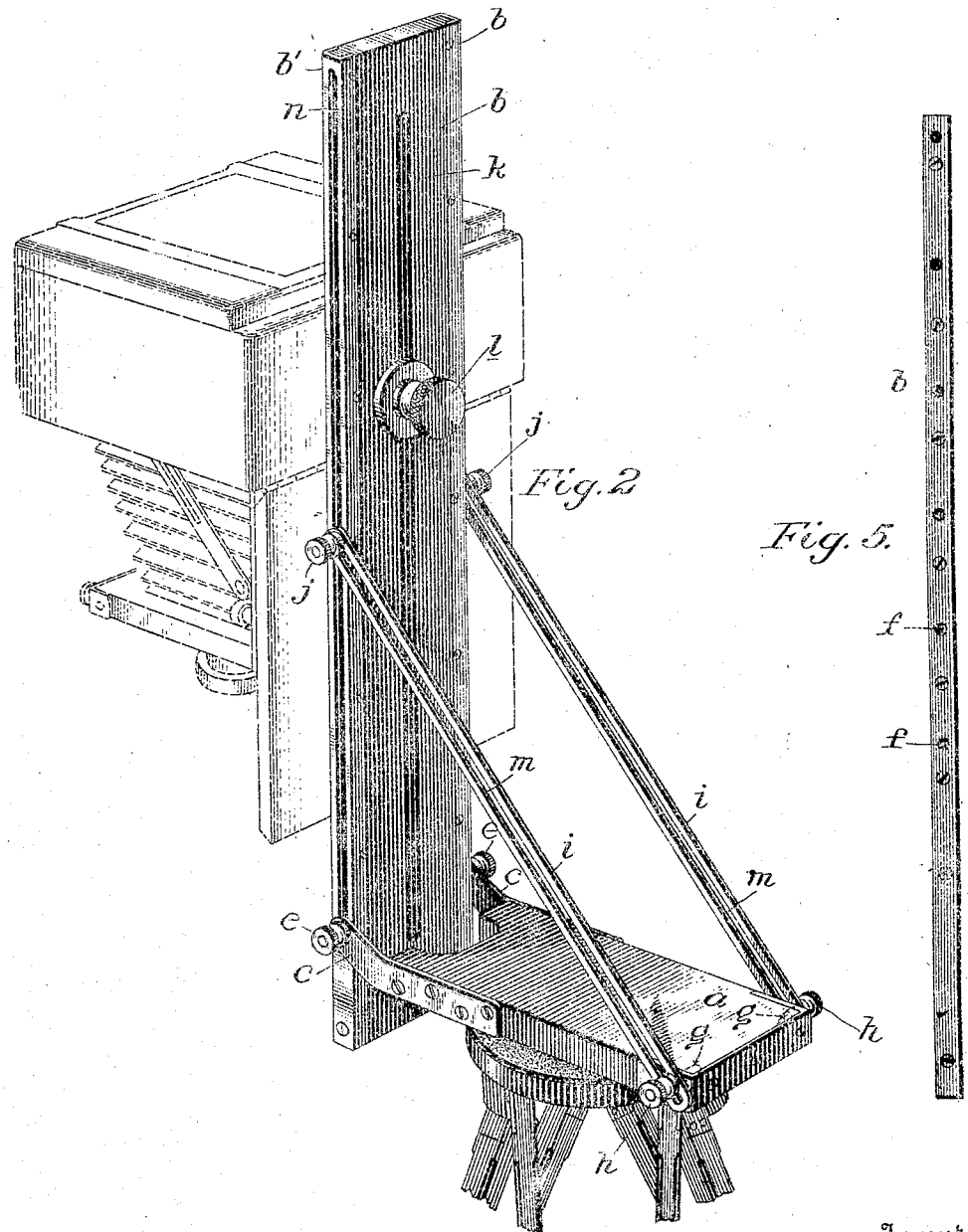

UNITED STATES PATENT OFFICE.

HARRY B. SHAW, OF TAKOMA PARK, DISTRICT OF COLUMBIA.

CAMERA-SUPPORT.

1,006,693.  Specification of Letters Patent.  Patented Oct. 24, 1911.

Application filed February 3, 1910. Serial No. 541,945.

(DEDICATED TO THE PUBLIC.)

*To all whom it may concern:*

Be it known that I, HARRY B. SHAW, an employee of the Department of Agriculture of the United States of America, residing at Takoma Park, District of Columbia, (whose post-office address is Takoma Park, District of Columbia,) have invented a new and useful Improvements in Camera-Supports.

This application is made under the act of March 3, 1883, chapter 143 (22 Stat., 625), and the invention herein described and claimed may be used by the Government of the United States or any of its officers or employees in the prosecution of work for the Government, or any person in the United States, without payment to me of any royalty thereon.

My invention relates to a stand or support for photographic cameras.

The object of my invention is to produce a cheap and inexpensive device for use in holding or supporting photographic cameras at any desired angle between the vertical and the horizontal. This stand may be attached to any ordinary portable camera tripod, or any other suitable camera support. This stand is of especial utility in photographing growing plants or other objects on the ground, for photographing any object which must be placed in a horizontal position to secure the desired results, and to photograph any object requiring the camera to be placed at a considerable inclination either upward or downward. In using the camera in a vertical position this stand enables the operator to adjust the camera within a considerable range nearer to, or farther from the object to be photographed without the necessity of readjusting the tripod. It is of great utility in these directions to any one who has occasion to use a camera vertically or at extreme angles. It may be constructed of any desirable size.

The nature, characteristic features and scope of my invention will be more fully understood from the following description, taken in connection with the accompanying drawings, forming a part hereof, wherein—

Figure 1 is a side perspective view of my invention attached to the tripod and arranged in a closed position. Fig. 2 is a side perspective view of my invention attached to the tripod in an open position, with a camera attached thereto in a vertical position. Fig. 3 is a sectional view of my invention when attached to the tripod in the closed position shown in Fig. 1. Fig. 4 is a view of a portion of the bed showing in section the application of the binding screw in the slot on the side of the bed. Fig. 5 is a view of one side of the bed showing the alternative method wherein a series of sockets is employed instead of a continuous slot as shown in Fig. 2.

Referring to the drawings, *a*, represents the base of my camera support, and *b* the adjustable bed thereof. The base, *a*, is provided at its center with a socket, *a'*, into which said socket, *a'*, the standard screw of any ordinary tripod will fit and securely hold the camera support to the tripod head. The base, *a*, is also provided with metal strips, *c c*, arranged on each side of its front end, having openings, *d d*, therein for the reception of the screws, *e e*. These strips, *c c*, serve to hold and retain the adjustable bed, *b*, in position, and to act as a hinge on which the said bed, *b*, may be turned to any desired angle between the vertical and horizontal. This object is accomplished by loosening the binding screws, *h h*, at the rear end of the base, *a*, thus releasing the metal slides, *i i*, at their lower ends, the bed, *b*, then being free to move to any desired angle. When adjusted, the bed, *b*, is again secured by tightening the screws, *h h*. The base, *a*, is further provided with sockets, *g g*, on each side of its rear end, adapted for the reception of binding screws, *h h*, which hold and retain the metal slides, *i i*, in place. The slides, *i i*, are slotted in the center in order that the screws, *h h*, may pass through such slots and hold the slides, *i i*, tightly against the rear end of the base, *a*, and the slides, *i i*, are adapted to be attached to the bed, *b*, by means of the binding screws, *j j*, which pass through the slots, *m m*, in said slides and fit into the slots, *n n*, as shown in Fig. 2 of the drawings.

In the center of the adjustable bed, *b*, is a longitudinal slot, *k*, which permits the adjustment of a camera at any part of the length of said slot. A camera is attached to the bed, *b*, by means of a screw, *l*, which can pass through any part of the slot, *k*, into a socket in the camera adapted to receive the screw, *l*, and tightening the screw, *l*, in this position until it becomes securely fastened, the camera is held firmly, as shown in Fig. 2. A notch is cut in the front end of the base, $a$, to admit the passage of the screw, $l$, when the bed, $b$, is lowered to such an extent as to necessitate the passage of the screw, $l$, through said notch.

In practicing my invention, the support is attached to a tripod or other suitable stand by screwing the base, $a$, securely on the tripod head, and when so attached, the bed, $b$, is elevated, the screws, $e\,e$, are securely tightened through the openings, $d\,d$, of the strips, $c\,c$, into the appropriate portion of the slots, $n\,n$, on each side of the bed, $b$. Then the slides, $i\,i$, are fastened to the bed, $b$, at its upper end by means of the screws, $j\,j$, passing through the slots, $m\,m$, in the said slides into the slots, $n\,n$, on each side of the bed, $b$, as shown in Fig. 2. The slides $i\,i$, are fastened to the rear end of the base, $a$, by the screws, $h\,h$, passing through the slots, $m\,m$, at the lower end of the said slides, $i\,i$, into the sockets, $g\,g$, when the bed, $b$, and the slides, $i\,i$, are rigidly adjusted to the base, $a$, by means of the screws, $e\,e$, and $h\,h$, as described, the support is then in proper position for the attachment of a camera which is accomplished by means of the screw, $l$, passing through the slot, $k$, in the bed, $b$, into a socket in the camera arranged for the reception of the screw, and secured tightly, so as to thoroughly secure the camera to the support. If it be desired to place the camera at an angle the screws, $h\,h$, are loosened, whereupon the slides, $i\,i$, are released at the lower end and travel backward over the screws, $h\,h$, and the operator adjusts the bed, $b$, at the desired angle and securely tightens the screws, $h\,h$. This applies whether the preferred form with slots, $n\,n$, as shown in Fig. 2 of the drawings, or the series of sockets, $f\,f$, as shown in Fig. 5 of the drawings, be employed. In performing this action it is unnecessary to remove the camera from the bed, $b$.

I do not confine myself to the use of the slots, $n\,n$, in order to secure the bed, $b$, to the base, $a$, and the slides, $i\,i$, in any of the positions hereinbefore described but the sides of the bed, $b$, may have a metal plate attached thereto having a series of sockets therein adapted for the reception of binding screws, as shown in Fig. 5 of the drawings. These sockets in the metal strips attached to side of the bed, $b$, I designate $f\,f$. When the operator wishes to lower the bed, $b$, in order to adjust the camera in relation to the object to be photographed, where such bed is provided on each side with a metal strip having the slots, $n\,n$, the binding screws, $e\,e$, and $j\,j$, are loosened and the bed, $b$, is made to slide down between the screws, $e\,e$, and $j\,j$, until the proper position is obtained, then the screws, $e\,e$ and $j\,j$, are again tightened, thus securing the bed, $b$, in the desired position.

If the bed, $b$, is provided with a metal strip on each side having a series of sockets, $f\,f$, therein, the screws, $e\,e$ and $j\,j$, are released and the bed, $b$, is lowered until the proper position is obtained; then the screws, $e\,e$, are tightly screwed into the proper sockets of the series of sockets, $f\,f$, which are suitably arranged for holding the bed, $b$, securely; the screws, $j\,j$, are likewise screwed into the sockets, $g\,g$, on each side of the front end of the base, $a$; thus the bed, $b$, is securely held in position.

My invention may be made of any material which is sufficiently substantial to hold a camera, and perform the functions herein described.

Having thus described my invention, I claim as follows:

A camera support consisting of a base, a bed pivoted to said base and adapted to be adjusted to an angle of 90° thereto and having a longitudinal slot therein, a set screw slidable in said slot and adapted to hold the camera in adjusted position upon said bed, slides connecting said base and bed and having longitudinal openings therein, set screws in said base and bed respectively and projecting through said openings and adapted to hold the said base and bed in relative adjustment, substantially as specified.

In testimony whereof, I affix my signature in the presence of two subscribing witnesses.

HARRY B. SHAW.

Witnesses.
W. A. ORTON,
W. W. GILBERT.